March 27, 1928.  1,663,802
E. A. LARSSON
CAR, AIR, AND ELECTRIC COUPLER SYSTEM
Filed April 12, 1927
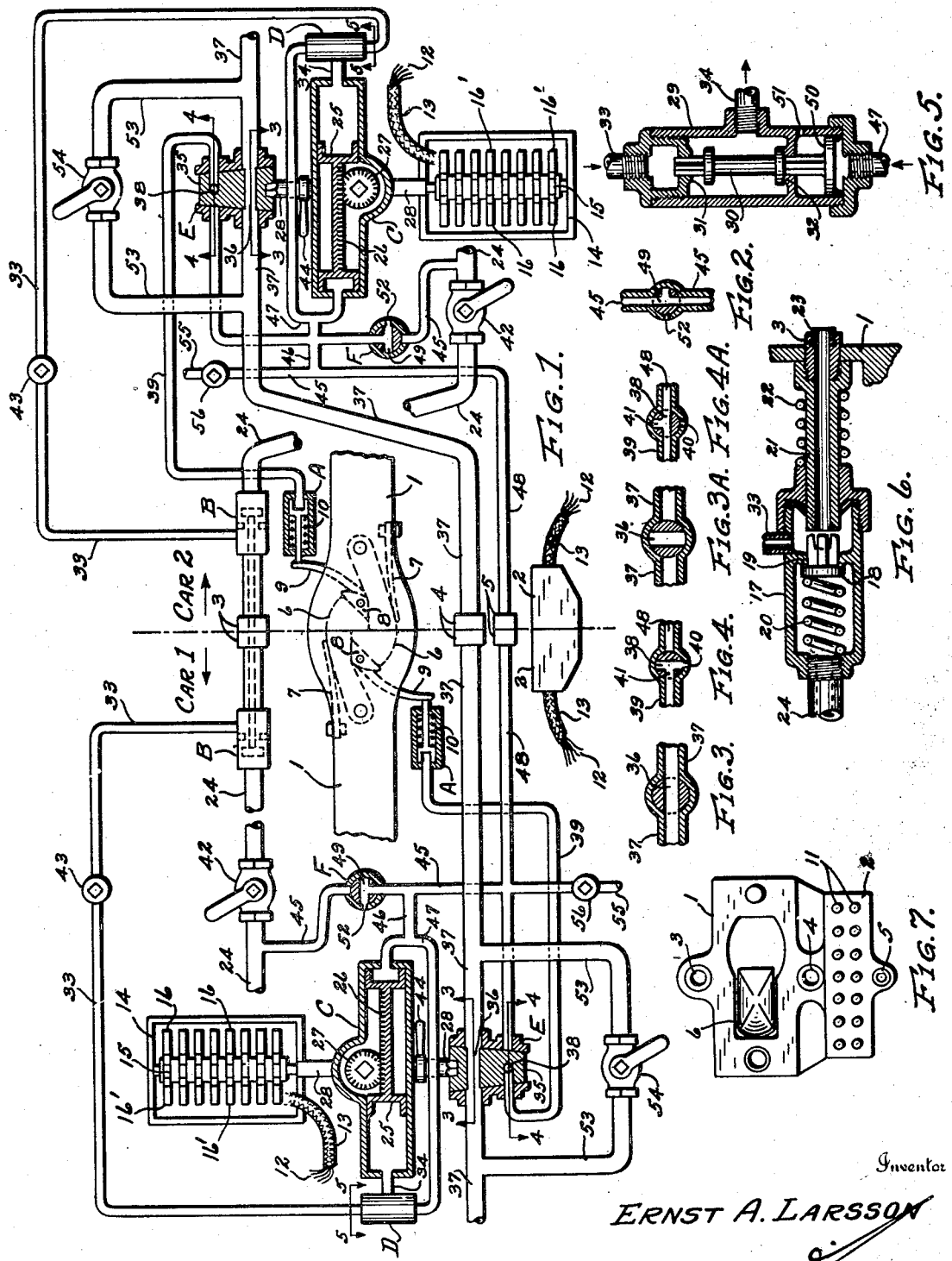
Inventor
ERNST A. LARSSON
By
Attorney Patented Mar. 27, 1928.

1,663,802

UNITED STATES PATENT OFFICE.

ERNST A. LARSSON, OF MANSFIELD, OHIO, ASSIGNOR TO THE OHIO BRASS COMPANY, OF MANSFIELD, OHIO, A CORPORATION OF NEW JERSEY.

CAR, AIR, AND ELECTRIC COUPLER SYSTEM.

Application filed April 12, 1927. Serial No. 183,145.

My invention relates to car, air and electric couplers and particularly to that class of coupler in which the mechanism for the three classes of couplings named are combined in one.

The object of my invention is to provide a combined car, air and electric coupler in which the three classes of couplings are made automatically upon impact of two cars when brought into coupled relation, whereby the air lines, which are, as a rule, used in coupling the air brake system, and the electric circuits for operating the cars and for various other uses, will be coupled and the cars themselves will be mechanically held in coupled relation.

Another object of my invention is to provide means whereby two cars coupled by my combined car, air and electric coupler may be uncoupled at will of the operator from a station in or on either of the coupled cars.

Other objects will appear as I further describe my invention herein.

My invention resides in the new and novel combination, construction, relation and co-operation of the various parts hereinafter fully described and shown in the accompanying drawing.

In the drawing:

Fig. 1 is a schematic drawing, showing the ends of two cars in coupled relation and in condition for operating the cars.

Fig. 2 shows the relation of pipes and ports of the uncoupling control valve while the operator is in the act of effecting an uncoupling.

Fig. 3 shows the relation of the pipes and ports in connection with the brake line valve, taken on the line 3—3 of Fig. 1 when the cars are in coupled and operative relation.

Fig. 3A shows the relation of the ports and pipes for the same valve as in Fig. 3, but when the cars are in uncoupled or single operating relation, and shows the brake line valve as closed.

Fig. 4 shows the relation of the pipes and ports controlling the uncoupling cylinder and taken on the line 4—4 of Fig. 1 when the coupled cars are in operative relation.

Fig. 4A shows the relation of the pipes and ports in connection with the same valve shown in Fig. 4 when the cars are in uncoupled relation and operating as single units.

Fig. 5 is a vertical section of a combined check, feeder and bleeding valve taken on the line 5—5 of Fig. 1.

Fig. 6 shows a section of a check valve which I may employ in the reservoir line of the brake system, which will automatically open on impact and automatically close on uncoupling of the cars.

Fig. 7 is a face view of my combined car, air and electric coupler.

Cars at the present day are very often, if not usually, equipped with an air brake system, which may require one or more main conduits, and which must be connected when two cars are coupled together for single operation.

The system generally employed is that requiring what is known as a reservoir or main supply line and a brake line, which, if opened to atmosphere intentionally or unintentionally, will cause an application of the brakes, and when opened to atmosphere unintentionally will produce what is known as an emergency brake application.

Cars are also equipped with electric circuits for the operation of the motors, lights, heater, signals, etc., and these circuits are usually connected on two coupled cars so as to be under control of the operator on the forward car.

My invention provides means for automatically opening control valves in the brake and reservoir line upon the coupling of two cars, and the automatic closing of the reservoir line when the cars are uncoupled, either intentionally or accidentally, but the brake line control valve is not closed, only when closed by the operator.

If two coupled cars should separate accidentally, the brake line would be open to atmosphere and an emergency application of the brakes applied, but when the cars are separated intentionally the operator closes the control valve in the brake line prior to the separation of the cars.

My invention also provides for the automatic connecting of the electric circuits between two cars upon impact. In order to render the contacts on the face of the coupler dead when the cars are in an uncoupled relation, I provide a switch, which is interposed in the circuits adjacent to the contacts, which is under control of the operator and is opened prior to his separating the cars and simultaneously with the closing of the control valve in the brake line, and also prior to or simultaneous with the operation of the uncoupling mechanism for the car coupler.

In the preferred embodiment of my invention, I provide a combined car, air and electric coupler, which may be of various constructions, but I have shown one construction, the face of which is shown in Fig. 7 and which comprises a car coupler 1, the electric coupler 2, the air brake couplers 3 and 4 and the air control line 5. The car couplers are each provided with a hook-shaped coupling member 6 and a spring 7, yieldingly holding the hooks in a coupled relation and with a pivotally mounted cam 8 provided with a handle 9 by means of which the cam can be rotated, and such rotation will cause a separating movement of each coupling hook. It will be noted that the operation of a single cam 8 acting on both hooks will cause a complete uncoupling. When two cars are brought together the hooks yield and when in final coupled relation the springs 7 move the hooks back to normal or coupled relation, in which condition the hooks on the two cars are interlocked.

To effect a movement of the uncoupling cam 8, each coupler is provided with a pneumatically operated uncoupling cylinder and piston A, which comprises a cylinder and piston therein with a stem which engages the lever 9, and it is normally held in a retracted position by the spring 10. The lever 9 can be used for manually uncoupling the hooks 6 when desired. The car coupler as described above is shown more in detail in Patent 1,223,223, dated April 17, 1917. I prefer to make the uncoupling device A of such capacity that a single device A is capable of effecting an uncoupling of two cars, therefore, if there is any tendency under unusual conditions for the uncoupling mechanism to not operate, the combined effort of the two uncoupling devices A will be quite sure to effect an uncoupling. If desired, of course, each uncoupling device A can be made of small enough capacity such that one device will not under normal conditions effect an uncoupling, but the combined effort of the two devices will effect an uncoupling.

The electric coupler 2 is preferably of the butt end type, as shown in Patent 1,300,789, issued April 15, 1919, in which the various contacts 11 are yieldingly held in an advanced position, and when two cars are coupled the contacts of one car connect with corresponding contacts on the other car and are held in contact by the yielding action of the contacts. These contacts are connected to the various train line circuits 12 contained within the cable 13. The cable 13 enters a rotary type switch 14 of the ordinary well known type, in which there is mounted a rotatable drum 15 carrying a contact which connects the stationary contacts 16 and 16' when the switch is in a closed position, and electrically disconnects the contacts 16 and 16' when the switch is in an opened position, and the various wires 12 may be connected to the contacts 16' and wires leading from the contacts 16 to the various apparatus on the car. The operation of the switch 14 is under control of the operator when it is desired to effect an uncoupling, but the connecting of the circuits by the switch 14 is automatically effected upon the coupling of two cars, as will be later explained.

The reservoir and brake line circuits between the two cars are made and completed upon impact of the cars. In the face of the car coupler 1 are provided the air couplers 3 and 4 for the reservoir line and brake line respectively. These couplers are provided as for use with yielding rubber gaskets, which contact and maintain an air tight connection between the air couplers when in coupled relation. Interposed in the reservoir line of each car is a check valve device B, one form of which is shown in detail in Fig. 6. The check valve device, as shown schematically in Fig. 1, is preferably positioned upon the coupler 1 and is shown with a projecting stem which contacts with a similar stem on a cooperating car, and opens the check upon impact of the cars, thus establishing a connection of the reservoir line between the two cars, and this check automatically closes under spring action when the cars are separated.

In Fig. 6, the device therein shown comprises the body member 17 with a check 18 and held against the seat 19 by means of the spring 20. Slidably mounted in the body 17 and projecting therefrom is the stem 21, held in a forward position by a spring 22, and the stem 21 has in its forward end the coupler 3 in which is mounted the rubber gasket 23. When two cars come together the gaskets 23 contact and the coupler 3, together with the stem 21, is moved backward and the stem engages the check 18 thereby opening the same against the spring pressure 20 and permitting air to flow through the device and from car to car from the reservoir pipe 24. As soon as the cars are separated, the springs 20 and 22 act to close the check 18 and to advance the stem 21.

I provide an actuating device C for moving the switch to its open or closed position by means of air pressure taken from the reservoir line 24. This device comprises a double ended cylinder 25 with a double piston and connecting rod 26. The connecting rod constitutes a rack which engages with a pinion 27, which is fixed to the shaft 28 for operating the drum 15 of the switch 14. With the device C and its parts in the position shown schematically in Fig. 1, the switch 14 is in its closed or operative position when two cars are coupled. To the left hand end of the cylinder 25 is a combined supply, bleeder and check valve D, one form of which is shown in detail in Fig. 5.

The device as shown in Fig. 5 comprises a body member 29 in which is mounted the double check valve 30 and adapted to engage the seats 31 and 32. Whenever pressure enters the pipe 33, which leads from the check valve B, the double check 30 is held against the seat 32 and air flows through the pipe 34 to the left-hand end of the cylinder 25, moving the pistons toward the right-hand end of the cylinder. This rotates the pinion 27 and the drum 15 of the switch to its closed position, thereby connecting the circuits of the car to the contacts 11 of the electric coupler. It will be noted that whenever two cars are brought together in coupled relation that as soon as the check valves B open, air will be permitted to flow from the reservoir line 24, through the pipe 33 to the device D, and from there to the actuating device C, thereby moving the switch 14 to its closed position.

Secured to the lower end of the shaft 28 is a valve E in which the valve plug 35 is provided with a port 36 for controlling the flow of air through the brake pipe 37 and port 38 for controlling air to the uncoupling cylinder A through the pipe 39. The ports 36 and 38 are set at right angles to each other such that the pipe 37 is open when the pipe 39 is closed, and the opening and closing, or vice versa, of the pipes 37 and 39 is substantially simultaneous with each other and with the operation of the switch 14, and when the valve E is maintaining the pipe 37 in an open position, the switch 14 is in a closed position and vice versa. It will be noted, however, that the port 36 is substantially closed before the port 38 is opened, thereby effecting a closing of the pipe 38 and an opening of the switch 14 substantially prior to the flooding of the line 39 and the operation of the car uncoupling mechanism. The position of the ports 36 and 38 when the cars are in an uncoupled relation and operating as single units, are shown respectively in Figs. 3$^A$ and 4$^A$.

Leading from the port 38 in Fig. 4 will be noted a small port 40 connecting with the port 38, which in turn connects with the pipe 39 by the port 41 such that when the mechanism set as shown in Fig. 1, any air which might tend to leak into the pipe 39 cannot produce a pressure therein and operate the device A, as such air would pass to atmosphere through the port 40.

The combined valve E could, of course, be made into two valves operating from the shaft 28 if desired.

It will be recognized that since the valve E is connected to the shaft 28, the shaft 28 is operated by the actuating device C, which in turn is operated upon the coupling or bringing together of two cars, that the port 36 in the valve E will be automatically opened when the cars are brought together, thereby automatically establishing communication of the brake line 37 on two cars upon impact of the cars. Mounted in the reservoir line 24 is the usual hand operated valve 42, which is normally left open, but can be closed manually. Also, in the line 33 is a hand operated valve 43, which is normally in an open position, but can be manually closed when desired.

Mounted on the shaft 28 is a handle 44 by means of which the shaft 28 can be operated manually when desired. While the switch 14 and connected mechanism could be incorporated or mounted upon the coupler 1, I prefer to mount the switch 14 and connected mechanism upon the car body adjacent the coupler 1.

When it is desired to effect uncoupling, the operator finds it necessary only to operate the valve F, which is under manual control. The valve in Fig. 1 is shown in an "off" position. In Fig. 2 the ports are shown in an "on" position or position effecting uncoupling, and after an uncoupling has been effected the valve F returns to or is returned with its ports in the position shown in Fig. 1. The valve F is connected to the reservoir line 24 by means of the pipe 45, and after leaving the valve F the pipe 45 connects to the right-hand end of the cylinder 25 by means of the pipe 46, and to the lower end of the device D by means of the pipe 47, and the pipe 45 also connects to the control pipe 48, which in turn connects to the coupler 5.

When the operator moves the valve F to the position shown in Fig. 2, the port 49 establishes a passage through the pipe 45 for the air from the reservoir line 24, and the air flows through the pipe 46 to the right-hand end of the device C, tending to move the pistons to the left, but there is air pressure in the left-hand end of the cylinder equal to the air pressure in the right-hand end of the cylinder, therefore, to relieve the air pressure in the left-hand end of the cylinder 25, air flows through the pipe 47 and acts upon the piston 50 of the device D (see Fig. 5), and raises the stem and checks 30 until the check engages the seat 31, thereby shutting off the flow of air from the pipe 33 to the left-hand end of the cylinder 25, and raises the check off of the seat 32 and establishes an air passage from the cylinder 25 to atmosphere, through the pipe 34 and air vent 51. This permits the air pressure in the right-hand end of the device C to move the double piston to the left, thereby operating the pinion 27 and the shaft 28, which opens the switch 14, closes the port 36 and then opens the port 38, as shown in Figs. 3^A and 4^A respectively, and this permits air to flow from the pipe 45 through the pipe 48, the port 38 and the pipe 39 to the uncoupling device A. Assuming that the operator is stationed in car 1, it will be apparent that these operations will all take place in car 1 first. In order to effect the same uncoupling operation in car 2, the air passes through the pipe 48 of the car 1, through the air couplers 5 on the two cars and through the pipe 48 on car 2 and from there to the actuating mechanism C and D on car 2, and thereby produces the same operation of the mechanisms C and D as on car 1, and thereby effecting the opening of the switch 14, the closing of the port 36 in the brake line 37, and the opening of the port 38 and the operation of the uncoupling device A all on car 2.

The valve F is provided with a port 52, which prevents the building up of pressure in the line 48 when the cars are in coupled position.

The port 38 being preferably at the small end of the valve E is of relatively small capacity, therefore, air enters the cylinder A at a very slow rate compared with the flow of air through the pipes 48 on the two cars, and, therefore, the device A may not operate until after the switch 14 and valve E on car 2 have operated. Should the couplers 1, for any reason, not operate under the action of the device A on one car, then when the device A on the second car comes into operation, the combined effort of the two cylinders will be sufficient to effect an uncoupling.

I show a by-pass 53 and a valve 54 therein around the valve E. This valve 54 is normally in a closed position, but can be used to render the brake line effective in emergency should the device C, or its connected mechanism, become inoperative for some reason.

It will be understood that the two ends of each car may be equipped alike and a train of cars may consist of two or more cars which couple automatically upon impact and, if desired, the brake pipe valve E can be closed on all coupled ends of any number of cars from any control valve F, if desired, by connecting the pipe 45 or 48 on the two ends of the car by the pipe 55 which will permit charging with air pressure the control pipe 48 between each pair of coupled cars. If it is desired to have only two adjacent coupled cars uncoupled then the hand valve 56 is to be closed and the valve F when operated will uncouple only the two adjacent coupled ends.

What I claim is:

1. In a car, air and electric coupling system, electric circuits, a switch in said circuits, air-brake lines, a valve in each of the lines, a car coupler, a pneumatic uncoupling device for the car coupler, a pneumatically operated device to move the switch to its open position and simultaneously one of the said valves to its closed position, piping connecting the last said actuating device and one of the air-brake lines, a controlling valve in said piping, piping connected to the uncoupling device under control of the said controlling valve and means interposed in the last said piping to control the flow of air therein such that the air to the said uncoupling device is permitted to flow thereto when the switch moves to its open position.

2. In a car, air and electric coupling system, a switch to control one or more electric circuits, air-brake lines; a valve in one of the lines; a car coupler; pneumatic uncoupling mechanism for the car coupler; piping to the uncoupling mechanism to supply air thereto; a valve to control the flow of air therein; pneumatically operating mechanism to move the switch and the valve in the piping to the uncoupling mechanism to their open position and the valve in the air-brake line to its closed position; means to cause the switch and valves to operate simultaneously and piping and controlling means therein to supply air to the first said piping and the second pneumatically operating mechanism at will of the operator.

3. A car, air and electric coupling system comprising a switch to control one or more electric circuits; air-brake lines; a valve in one of the lines; a car coupler; pneumatic uncoupling mechanism for the car coupler; piping to conduct air to the uncoupling mechanism to supply air thereto, a single pneumatically operating mechanism to move the switch to its open and the valve in the air-brake line to its closed position; means associated with and controlled by the movement of the single operating mechanism to control the air flow to the uncoupling mechanism and assure the closing of the air-brake line valve when the uncoupling mechanism operates; piping to conduct air to the single pneumatically operating mechanism and means in said piping to control the flow of air therein at will of an operator.

4. In a car, air and electric coupling system, a switch to control one or more electric circuits; a reservoir air line; a valve therein to open upon impact of two cars; a brake air line with a valve therein; a car coupler and pneumatic uncoupling mechanism therefor; pneumatically operating mechanism to operate the switch to its open or closed position and the brake line valve to its closed or open position respectively;

piping connecting the operating mechanism to the reservoir line to operate the mechanism to close the switch and open the brake line valve when the reservoir line valve opens; piping connecting the reservoir line to the pneumatically operating mechanism and a control valve therein to control the flow of air therein to operate the mechanism to open the switch and close the brake line valve; piping connected to the uncoupling mechanism to supply air thereto and under control of the control valve and means associated with the last said piping and controlled by the movement of the operating mechanism to assure the switch being open and the brake line valve being closed when the uncoupling mechanism operates.

5. In a car, air and electric coupling system, a switch to control one or more electric circuits, a reservoir air line; a valve therein to open upon impact of two cars; a brake air line with a valve therein; a car coupler and pneumatic uncoupling mechanism therefor; pneumatically operating mechanism to operate the switch to its open or closed position and the brake line valve to its closed or open position respectively; piping connecting the operating mechanism to the reservoir line to operate the mechanism to close the switch and open the brake line valve when the reservoir line valve opens; piping connecting the reservoir line to the pneumatically operating mechanism and a control valve therein to control the flow of air therein to operate the mechanism to open the switch and close the brake line valve; piping connected to the uncoupling mechanism to supply air thereto and means associated with the last said piping and controlled by the movement of the operating mechanism to assure the switch being open and the brake line valve being closed when the uncoupling mechanism operates.

6. In a car and air coupling system, a car coupler, pneumatic uncoupling mechanism therefor, a reservoir air line and a valve to automatically open when the line is connected to a like line on a coupled car, a brake air line and a valve therein, pneumatically operating mechanism for the valve, piping connecting the operating mechanism to the reservoir line and under control of the valve therein to automatically operate the pneumatically operating mechanism when the cars couple to open the brake line valve, piping connecting the operating mechanism to a source of air and a control valve therein to control the operating mechanism to close the brake line valve at will of an operator, piping connecting the uncoupling mechanism to a source of air and means therein controlled by the movement of the operating mechanism to control the supply of air to the uncoupling mechanism and piping to connect the pneumatically operating mechanism on one car with that on a coupled car to cause substantially simultaneous operation of the two pneumatically operating mechanisms to close the brake valves.

7. In a car and air coupling system, a car coupler, pneumatic uncoupling mechanism therefor, a brake air line and a valve therein, pneumatically operating mechanism for the valve, piping connecting the operating mechanism to a source of air and a control valve therein to control the operating mechanism to close the brake line valve at will of an operator, piping connecting the uncoupling mechanism to a source of air and means therein controlled by the movement of the operating mechanism to control the supply of air to the uncoupling mechanism and piping to connect the pneumatically operating mechanism on one car with that on a coupled car to cause substantially simultaneous operation of the two pneumatic operating mechanisms to close the brake valves.

8. In a car and air coupling system, a brake and a reservoir air line, a control valve in each line, a car coupler, a pneumatic uncoupling mechanism for the coupler, a pneumatically operating mechanism for only one of the air line valves, piping connecting the operating mechanisms on two coupled cars, piping on each car and a valve therein under control of an operator to charge the line at will of the operator to move the operating mechanism on each car to close the valve on each car from either car, piping on each car to supply air to the uncoupling mechanism and means associated with the last said piping and controlled by the movement of the operating mechanism to prevent air flowing to the uncoupling mechanism while the brake line valve is open.

9. In a car and air coupler system on two coupled cars, each car provided with a train air line and a control valve therein, a pneumatically operating mechanism for the valve, a car coupler and a pneumatic uncoupling mechanism therefor, piping to supply air to the operating mechanism to operate the same to close the train line valve and a manually operated valve therein to control the access of air to the operating mechanism, piping to supply air to the uncoupling mechanism and connected to the first said piping between the valve therein and the operating mechanism, means in the piping to the uncoupling mechanism to prevent the admission of air to the uncoupling mechanism prior to the closing of the valve in the train air line regardless of the pressure in the piping systems and piping to connect with the same on a coupled car to supply air to the operating mechanism on both cars to operate the same to close the valves on both cars in the train line and controlled by the manually operated valve on one car, 10. In a car, air and electric coupling system, a reservoir line and a brake air line, a valve in each line, a switch to control one or more electric circuits, a car coupler, a pneumatically operating mechanism including a double ended cylinder for the switch and the valve in one of the lines, piping connecting one end of the cylinder to one of the air lines to move the operating mechanism to close the switch and open the valve upon impact of the cars, piping and a valve therein and connected to the other end of the cylinder to control admission of air to the cylinder to move the operating mechanism and to move therewith the switch to its open position and the valve to its closed position and piping to connect the operating mechanism on two coupled cars to operate the operating mechanism on the two cars from one car and means to uncouple the cars.

11. In a car, air and electric coupling system on two coupled cars, each having a car coupler, pneumatic uncoupling mechanism for the coupler, a train air line, a control valve therefor, an operator's control valve, a switch for one or more electric circuits, a single pneumatically operating mechanism for the switch and air line control valve, and piping connecting the uncoupling mechanisms, the operating mechanisms and the operator's valves on the coupled cars to open the switch, close the control valve and operate the uncoupling mechanism on the two cars when the operator's valve is operated and means to prevent the uncoupling mechanism operating on one or both cars before the switch on one or both cars has opened.

12. In a car and air coupling system on two coupled cars, each car provided with a reservoir air line, a valve therein to automatically open on impact of the cars and automatically close in both cars upon separation of the cars, a brake air line, a valve therein, pneumatic mechanism to automatically open the brake line valves upon impact and manually operated means to control the operation of the pneumatic mechanism to cause the same to close the brake valve on both cars from one car at will of the operator.

13. In a car and air coupling system for coupling two cars, a car coupler coupling on impact, a pneumatic uncoupling device on either car capable of effecting an uncoupling, an air line, a valve therein, pneumatically operated mechanism to move the valve to its closed position when effecting an uncoupling, piping connecting the operating mechanism from car to car, a control valve to admit air to the piping and thence to the operating mechanism on the two cars to move the same and close the air line valve and piping connecting the uncoupling mechanism to the first piping and having means to control the flow of air therein such that air can flow to the uncoupling mechanism on one or both cars when the air line valve on the one or both cars is closed thus effecting an uncoupling if only one uncoupling mechanism operates.

14. In a car and air coupler system on two cars, a reservoir line and a brake line connected by the air couplers, a car coupler to couple on impact, a valve in each line on each car arranged to open automatically upon the bringing together of the cars, a pneumatic actuator for one of the valves, a valve to control the operation of the actuator to close the said one valve at will of the operator prior to uncoupling.

15. In a car and air coupler system on two coupled cars, a reservoir line and a brake line connected by the air couplers, a car coupler to couple on impact, a valve in each line on each car arranged to open automatically upon bringing the cars into coupled relation, means to close one of the valves by an operator at his will and said valve to remain open if the cars part accidentally and the other valve to close automatically upon normal or accidental separation of the cars.

16. In a car, air and electric coupling system, two air line pipes, a valve in one pipe to be opened upon impact of the couplers on two cars, a switch, a valve in the other pipe, a single actuator for the switch and second valve, means to automatically control the flow of air to the actuator to move the actuator in one direction to close the switch and open the valve manually operated means to move the actuator in the opposite direction to open the switch and close the valve and means comprising a car coupler to hold the air and electric coupling system in coupled relation with a companion car and to couple on impact.

17. In a car, air and electric coupling system described, a reservoir line, a valve in the line to open on impact, a brake line, a valve in the brake line, a switch, a pneumatic uncoupling mechanism for the car coupler, a valve controlling the operation of the uncoupling mechanism, a single pneumatic actuator for the switch, the valve in the brake line and the control valve for the uncoupling mechanism to close the switch, open the brake line valve and close the control valve for the uncoupling mechanism and operable from the reservoir line upon the opening of the reservoir valve.

18. In a car and air coupler to connect the air brake system on two coupled cars, a reservoir line, a valve therein to open and close automatically upon impact and separation of the two cars respectively, a brake line and a valve therein, means controlled by and upon the opening of the reservoir line valve to open the brake line valve automatically, piping connecting the various elements for said operations on the coupled cars simultaneously and a car coupler on each car to interlock and hold the cars in coupled relation.

19. In a car and air coupler to connect the air brake system on two coupled cars, a reservoir line, a valve therein to open and close automatically upon impact and separation of the cars respectively, a brake line and a valve therein, means controlled by and upon the opening of the reservoir line valve to open the brake line valve automatically, piping connecting the various elements for said operations on each car when coupled and manually operated means to effect the closing of the brake line valve prior to the separation of the cars and means comprising a car coupler arranged to couple automatically upon impact to hold the cars in coupled relation.

20. In a car, air and electric coupling system for connecting two cars, the air line and the electric circuits, a car coupler, an uncoupling device therefor, a train air line, a valve therein, one or more electric circuits, a switch therefor, an operating device for the switch and valve and arranged to open the switch when the valve is closed and vice versa, a piping system connecting said uncoupling device, and said operating device on the two cars, a control valve connected to the piping system and to a source of air to control the admission of air to the piping system, a valve in the piping system to control the flow of air to the uncoupling device and controlled by the operating device to prevent air flowing to the uncoupling device on either car prior to the opening of the switch on that car, the system operating to move the operating device on one or both cars when the control valve is operated in either car.

21. In a car and air coupling system on two coupled cars, each car having a brake and a reservoir line and a car coupler, a control valve in each line, a pneumatic uncoupling mechanism for each coupler, a pneumatic actuator on each car to open and close the brake line valve, auxiliary pipes and air couplers to connect the reservoir lines, and the actuators and a valve on each car interposed between the said air couplers and reservoir lines and normally closed and charging the actuators when opened on each car to close the brake line valve, piping connecting the first piping and the uncoupling mechanism and controlled by the normally closed valve, a valve in the last said piping to prevent air flowing to the uncoupling mechanism when the normally closed valve is opened until the actuator has closed the brake line valve and means preventing the opening of the last said valve while the brake line valve is open.

22. In a car and air coupling system provided with an air line to be connected on two coupled cars, a control valve in the line, a pneumatic actuator to move the valve to its open or closed position, piping connecting the actuator to a source of air supply and having an automatic operated control device therein to open and admit air from the pipe to one end of the actuator when pressure is built up in the pipe to move the actuator to open the control valve, other piping connecting the actuator to a source of air supply and having a normally closed manually operated valve therein to admit air to the other end of the actuator when the manually operated valve is opened to move the actuator to close the control valve and piping connected to the automatic device and to a source of air supply and controlled by the manually operated valve to admit air to the automatic device when the manually operated valve is opened to close the automatic device and shut off air pressure to the actuator and bleed one end of the actuator to atmosphere and piping connecting the cars for simultaneous operation on both cars.

23. In a car and electric coupler for a train line circuit, a coupler contact to which the train line is attached, a switch interposed in the circuit to open or close same, pneumatic controlled means to operate the switch, a valve and piping to control the admission of air to the said pneumatic means to operate it in one direction and automatically controlled means and piping to control the admission of air to the pneumatic means to operate it in the opposite direction, the said automatic means automatically admitting air pressure to the pneumatic means and permitting said pressure to continue until the valve is operated to admit air to the pneumatic means whereupon the automatic means will close off the air pressure to the pneumatic means and bleed the pneumatic means to atmosphere and means to hold the coupler contact in coupled relation with a cooperating contact.

In testimony whereof I affix my signature.

ERNST A. LARSSON.